(12) United States Patent
Wang et al.

(10) Patent No.: US 6,248,825 B1
(45) Date of Patent: *Jun. 19, 2001

US006248825B1

(54) GELS DERIVED FROM EXTENDING GRAFTED CENTIPEDE POLYMERS AND POLYPROPYLENE

(75) Inventors: Xiaorong Wang; Victor J. Foltz, both of Akron, OH (US); Takahiro Matsuse, Kodaira (JP); Naruhiko Mashita, Yokohama (JP); Shinichi Toyosawa, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/073,735

(22) Filed: May 6, 1998

(51) Int. Cl.$^7$ ................ C08J 3/00; C08K 5/24; C08K 5/01; C08L 51/00; C08G 63/48

(52) U.S. Cl. ............ 524/504; 524/261; 524/474; 524/476; 524/484; 524/485; 524/486; 524/491; 524/504; 525/74; 525/78

(58) Field of Search ............ 525/74, 78; 524/261, 524/476, 491, 474, 484, 485, 486, 504

(56) References Cited

U.S. PATENT DOCUMENTS

| | | |
|---|---|---|
| 2,725,367 | 11/1955 | Niederhauser et al. . |
| 2,971,934 | 2/1961 | Brown et al. . |
| 3,244,664 | 4/1966 | Zelinski et al. . |
| 3,281,383 | 10/1966 | Zelinski et al. . |
| 3,297,654 | 1/1967 | Barr et al. . |
| 3,414,551 | 12/1968 | Reid et al. . |
| 3,428,596 | 2/1969 | Strand et al. . |
| 3,480,580 | 11/1969 | Joyner et al. . |
| 3,481,910 | 12/1969 | Brunson . |
| 3,492,227 | 1/1970 | Kolaian . |
| 3,528,936 | 9/1970 | Kent et al. . |
| 3,577,365 | 5/1971 | Folzenlogen et al. . |
| 3,594,452 | 7/1971 | De La Mare et al. . |
| 3,751,378 | 8/1973 | Cowperthwaite et al. . |
| 3,761,458 | 9/1973 | Holler et al. . |
| 3,796,687 | 3/1974 | Collette et al. . |
| 3,840,449 | 10/1974 | Furukawa et al. . |
| 3,862,265 | 1/1975 | Steinkamp et al. . |
| 3,970,608 | 7/1976 | Furukawa et al. . |
| 3,985,830 | 10/1976 | Fetters et al. . |
| 3,998,907 | 12/1976 | DiGiulio . |
| 4,015,612 | 4/1977 | Pavlik et al. . |
| 4,017,669 | 4/1977 | Collette et al. . |
| 4,087,485 | 5/1978 | Huff . |
| 4,104,332 | 8/1978 | Zelinski et al. . |
| 4,132,531 | 1/1979 | Cummings et al. . |
| 4,139,417 | 2/1979 | Marie et al. . |
| 4,151,336 | 4/1979 | Sackmann et al. . |
| 4,151,337 | 4/1979 | Kanoh et al. . |
| 4,287,314 | 9/1981 | Fava . |
| 4,304,886 | 12/1981 | Bean, Jr. et al. . |
| 4,374,951 | 2/1983 | Lee et al. . |
| 4,404,321 | 9/1983 | Abolins et al. . |
| 4,404,322 | 9/1983 | Saito et al. . |
| 4,408,010 | 10/1983 | Le-Khac . |
| 4,423,196 | 12/1983 | Arlt et al. . |
| 4,427,828 | 1/1984 | Hergenrother et al. . |
| 4,502,229 | 3/1985 | Kitzman . |
| 4,506,056 | 3/1985 | Gaylord . |
| 4,540,753 | 9/1985 | Cozewith et al. . |
| 4,585,824 | 4/1986 | Uchida et al. . |
| 4,605,700 | 8/1986 | Le-Khac . |
| 4,683,275 | 7/1987 | Kato et al. . |
| 4,728,463 | 3/1988 | Sutker et al. . |
| 4,732,928 | 3/1988 | Mizushiro et al. . |
| 4,771,097 | 9/1988 | Sackmann et al. . |
| 4,772,657 | 9/1988 | Akiyama et al. . |
| 4,889,896 | 12/1989 | Canova et al. . |
| 4,893,055 | 1/1990 | Fuzii et al. . |
| 4,912,144 | 3/1990 | McCready . |
| 4,921,910 | 5/1990 | Lunt et al. . |
| 4,931,502 | 6/1990 | McCready . |
| 4,996,262 | 2/1991 | Pyke et al. . |
| 5,008,324 | 4/1991 | Killgoar, Jr. et al. . |
| 5,034,449 | 7/1991 | Mallikarjun . |
| 5,037,924 | 8/1991 | Tazi et al. . |
| 5,082,913 | 1/1992 | Tazi et al. . |
| 5,122,161 | 6/1992 | Benfaremo et al. . |
| 5,126,403 | 6/1992 | Graiver et al. . |
| 5,156,920 | 10/1992 | Aycock et al. . |
| 5,202,384 | 4/1993 | Pyke et al. . |
| 5,212,227 | 5/1993 | Sakazume et al. . |
| 5,219,628 | 6/1993 | Hathaway et al. . |
| 5,225,498 | 7/1993 | Sorathia et al. . |
| 5,244,971 | 9/1993 | Jean-Marc . |
| 5,318,854 | 6/1994 | Hamersma et al. . |
| 5,356,953 | 10/1994 | Harada et al. . |
| 5,373,048 | 12/1994 | Witzeman . |

(List continued on next page.)

FOREIGN PATENT DOCUMENTS

| | | |
|---|---|---|
| 702610 | 1/1965 | (CA) . |
| 34 30 802 A1 | 3/1986 | (DE) . |
| 42 25 875 A1 | 2/1994 | (DE) . |
| 42 39 437 A1 | 5/1994 | (DE) . |
| 42 41538 | 6/1994 | (DE) . |
| 0 177 401 | 4/1986 | (EP) . |

(List continued on next page.)

Primary Examiner—Patrick D. Niland
(74) Attorney, Agent, or Firm—David G. Burleson; Scott A. McCollister

(57) ABSTRACT

The present invention teaches a method for enabling the formation of a high damping, soft polymer gel. The method includes: reacting a poly(alkenyl benzene-co-maleimide) polymer with a maleated polyalkylene and an alkyl diamine under substantially dry conditions sufficient to form a polyalkylene grafted poly(alkenyl benzene-co-maleimide) polymer product; and, dispersing the polyalkylene grafted poly (alkenyl benzene-co-maleimide) polymer product with an extender oil sufficient to form the gel. The present invention also contemplates a polymer gel composition, a polymer composition and an article manufactured from the polymer gel composition.

23 Claims, No Drawings

U.S. PATENT DOCUMENTS

| | | |
|---|---|---|
| 5,414,044 | 5/1995 | Moriya et al. . |
| 5,432,662 | 7/1995 | Kato et al. . |
| 5,472,741 | 12/1995 | Sackmann et al. . |
| 5,489,657 | 2/1996 | Sue et al. . |
| 5,494,964 | 2/1996 | Meichsner et al. . |
| 5,494,981 | 2/1996 | Gorodisher et al. . |
| 5,532,317 | 7/1996 | Shinmura et al. . |
| 5,536,774 | 7/1996 | Segatta . |
| 5,548,031 | 8/1996 | Doi . |
| 5,585,434 | 12/1996 | DeNicola, Jr. et al. . |
| 5,585,436 | 12/1996 | Niessner et al. . |
| 5,602,200 | 2/1997 | Wissmann . |
| 5,618,881 | 4/1997 | Hojabr . |
| 5,634,122 | 5/1997 | Loucks et al. . |
| 5,637,410 | 6/1997 | Bonner et al. . |
| 5,651,927 | 7/1997 | Auda et al. . |
| 5,652,307 | 7/1997 | Niessner et al. . |
| 5,654,364 | 8/1997 | Bates et al. . |
| 5,655,820 | 8/1997 | Kervagoret . |
| 5,658,985 | 8/1997 | Eichenauer et al. . |
| 5,665,820 | 9/1997 | Leistner et al. . |
| 5,670,006 | 9/1997 | Wilfong et al. . |
| 5,684,122 | 11/1997 | Inoue et al. . |
| 5,691,411 | 11/1997 | Khouri et al. . |
| 5,710,228 | 1/1998 | Krause et al. . |
| 5,776,234 | 7/1998 | Schilling . |
| 5,783,630 | 7/1998 | Evans et al. . |
| 5,798,413 | 8/1998 | Spelthann et al. . |
| 5,821,032 | 10/1998 | DoMinh . |
| 5,869,695 | 2/1999 | Ulmer et al. . |
| 5,883,188 | 3/1999 | Hwang et al. . |
| 5,905,116 * | 5/1999 | Wang et al. ............................ 525/74 |
| 5,912,296 | 6/1999 | Wang et al. . |
| 5,965,666 | 10/1999 | Koo et al. . |
| 6,048,930 * | 4/2000 | Wang et al. ............................ 525/66 |

FOREIGN PATENT DOCUMENTS

| | | |
|---|---|---|
| 0 322 905 | 12/1988 | (EP) . |
| 0 322 905 A2 | 7/1989 | (EP) . |
| 0 408 470 A1 | 1/1991 | (EP) . |
| 0 440 922 A1 | 8/1991 | (EP) . |
| 0 536 753 A1 | 4/1993 | (EP) . |
| 0 728 767 A1 | 8/1996 | (EP) . |
| 922151 | 3/1963 | (GB) . |
| 952151 | 3/1964 | (GB) . |
| 60-243102 | 12/1985 | (JP) . |
| 6-56921 | 3/1994 | (JP) . |
| 6-248017 | 9/1994 | (JP) . |
| 8-255901 | 10/1996 | (JP) . |
| WO 96/23007 | 8/1996 | (WO) . |
| WO 97/00898 | 1/1997 | (WO) . |

* cited by examiner

GELS DERIVED FROM EXTENDING GRAFTED CENTIPEDE POLYMERS AND POLYPROPYLENE

FIELD OF THE INVENTION

This invention relates to the production of polyalkylene grafted poly(alkenyl benzene-co-maleimide) polymers and to the use of such polymers when oil extended in producing high damping, soft materials.

BACKGROUND OF THE INVENTION

The polymerization of styrene and maleic anhydride by free radical initiation is well known in the prior art. Similarly, poly(styrene-co-maleic anhydride) polymer is well known. Further, imidization between a maleic anhydride and a primary amine group is a commonly known chemical reaction. Patent publications which have recognized these reactions include: German Patent DE 4241538, assigned to Leuna-Werke A.-G; Japanese Patent JP 94248017, assigned to Monsanto Kasel Kk.; and, Italian Patent EP 322905 A2, assigned to Montedipe S.p.A. Various other non-patent publications have also recognized these reactions. Included among them are: L. E. Colleman, Jr., J. F. Bork, and H. Donn, Jr., J. Org. Chem., 24, 185(1959); A. Matsumoto, Y. Oki, and T. Otsu, Polymer J., 23 (3), 201 (1991); L. Haeussler, U. Wienhold, V. Albricht, and S. Zschoche, Themochim. Acta, 277, 14(1966); W. Kim, and K. Seo, Macromol. Rapid Commun., 17, 835(1996); W. Lee, and G. Hwong, J. Appl. Polym. Sci., 59, 599(1996); and, I. Vermeesch and G. Groeninckx, J. Appl. Polym. Sci., 53, 1356(1994).

The synthesis of monofunctional N-alkyl and N-aryl maleimides are also well known in the prior art. They have been extensively used to improve the heat stability of homo- and especially copolymers prepared from vinyl monomers. Typically, the bulk resins comprise ABS (poly(acrylonitrile-co-butadiene-co-styrene)) or a polyblend of poly(acrylonitrile-co-butadiene) and poly(styrene-co-acrylonitrile); PVC (poly(vinyl chloride)); SAN (poly(styrene-co-acrylonitrile)); PMMA (poly-(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point (T(g)) as determined by differential scanning calorimetry (DSC).

It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is particularly desirable to prepare a grafted copolymer having the impact strength of polypropylene and the elastomeric properties of a block copolymer. It is also desireable to add an extender or plasticizer to the resultant grafted copolymer in order to obtain a copolymer having a low Shore A hardness.

OBJECTS OF THE INVENTION

Accordingly, it is an object of this invention to provide an oil or low molecular weight component extended grafted "centipede" polymer of a maleated polypropylene and a poly(alkenyl benzene-co-maleimide) that is useful in producing high damping and soft materials.

More specifically, it is an object of this invention to provide a grafted centipede polymer formed by reacting maleated polypropylene and a poly(alkenyl benzene-co-maleimide) with a diamine.

Another object of the invention is to provide oil or low molecular weight component extended grafted centipede polymers that exhibit improved properties, including low Shore A hardness less than 35, high damping properties and a service temperature of about 100° C.

SUMMARY OF THE INVENTION

The present invention is directed to an oil or low molecular weight component extended grafted poly(alkenyl benzene-co-maleimide)-polypropylene polymer soft gel composition having damping properties useful in producing molded products having heat resistance and a high elasticity and damping property.

The present invention is broadly directed to grafted polymer compositions of a maleated polypropylene and a poly(alkenyl benzene-co-maleimide) reacted with a diamine. It is further directed to a process for preparing an oil extended grafted polymer compositions broadly comprising a maleated polypropylene grafted to a functionalized thermoplastic material, namely a poly(alkenyl benzene-co-maleimide), under conditions sufficient to permit grafting of the functionalized polypropylene with the functionalized thermoplastic material. The grafted polymer is a glass-like material that becomes a soft and rubber-like elastomer after being oil-extended.

DETAILED DESCRIPTION OF THE INVENTION

The extended grafted polymer gels of the present invention contain: 100 parts by weight of a grafted polymer of a poly(alkenyl benzene-co-maleimide) having at least one maleated polypropylene segments grafted thereto through the at least one functional linkage formed by a crosslinking reaction with a diamine grafting agent; and at least 30, preferably 30 to 1000, parts by weight of an extender such as an oil or a low molecular weight component.

The poly(alkenyl benzene-co-maleimide) is a "centipede" polymer formed by imidizing a poly(alkenyl benzene-co-maleic anhydride) with a primary amine. The "centipede" polymer has a high molecular weight spine connected with many relatively short side chains formed from the addition of the primary amines. The length of the main chain usually equals or is longer than the entanglement length, which is herein defined theoretically as an order of magnitude of 100 repeating units, while the length of the side chains is much smaller than the entanglement length.

The preferred alkenyl benzenes contributed monomer units of the poly(alkenyl benzene-co-maleimide) "centipede" polymer are either styrene or alpha-methylstyrene. The terms "alkenyl benzene" and "vinyl aromatic" are understood to be interchangeable as used herein.

The poly(alkenyl benzene-co-maleimide) described herein are subsequently graft-reacted through a difunctional linking or grafting agent to a maleated polypropylene to yield a grafted polymer having at least one polypropylene segment grafted thereto through the at least one functional linkages thus formed.

The maleated polypropylene may be any of the conventionally known polypropylene compounds that are subsequently maleated by methods known in the art. The polypropylene grafted segment or segments have molecular weights "$M_w$" of about 10,000 up to about 10,000,000, or higher, preferably about 20,000 to about 300,000.

The crystallinity, or tacticity, of the polypropylene may vary from being substantially amorphous to being completely crystalline, that is from about 10–100% crystallinity. Most typically, because of the extensive commercial use of isotactic polypropylene, the grafted polypropylene will be substantially crystalline, e.g., greater than about 90%. Generally, the polypropylene is substantially free of ethylene. However, under certain circumstances small amounts of ethylene, on the order of less than about 10% by weight, may be incorporated. Furthermore, in certain instances the polypropylene contain small amounts of ethylene in copolymers known as "reactor copolymers". Thus, it is within the scope of the invention that the grafted polypropylene contain minor amounts of ethylene, both as part of ethylene-propylene segments and as polyethylene segments.

Polymerization conditions for the preparation of polypropylene are well known in the art. Propylene can be polymerized into isotactic polypropylene in the presence of stereo-specific Ziegler-Natta catalyst systems comprising compounds of the transition metals of Groups 4 to 6 and 8 of the Periodic Table of elements, preferably titanium compounds, most preferably titanium halides, and organometallic compounds of elements of groups 1 to 3 of the Periodic Table, especially aluminum alkyls or aluminum alkyl halides. Illustrative examples include titanium trichloride, titanium tetrachloride as catalysts and triethylaluminum and diethyl aluminum chloride as cocatalysts. These transition metal catalyst systems can be non-supported or supported, for example, silica gel, or metal oxides and dihalides, such as MgO, $MgCl_2$, $ZnCl_2$, etc. Such systems can be reacted together and can be complexed with a variety of Lewis-base electron donors.

Molecular weight control is typically achieved by the incorporation of hydrogen via a feed stream into the polymerization reactor. The hydrogen is added at about 0 to 30 mole % based on the total monomer. The polymerization reaction is preferably conducted according to the slurry method employing an inert hydrocarbon diluent or liquid propylene as the vehicle. The polymerization temperature can be in the range of about 50° C. to about 100° C. and is preferably at a range or about 60° C. to about 80° C. Polymerization pressure can also vary over a wide range and is not particularly limited. The polymerization pressure can for example be in the range from between atmospheric pressure to 37,000 KPa. Such procedures and components are only illustrative of the knowledge in the art with respect to polypropylene polymerization, any are contemplated as useful within the scope of the invention. For general review of literature and patents in the art see "Olefin Polymers (Polypropylene)" in the Kirk-Othmer Encyclopedia of Chemical Technology, 3rd Edition v. 16, 453–469 (J. Wiley & Sons, 1981).

The maleinization of the polypropylene compound to maleated polypropylene is conveniently accomplished by heating a blend of polypropylene and ethylenically unsaturated carboxyl group-containing compounds, e.g., maleic anhydride, within a range of about 150° to 400° C., often in the presence of free-radical initiators such as organic peroxides that are well-known in the art. Free-radical grafting of the carboxyl group-containing compounds onto the polypropylene readily results. Methods of preparing these grafted polymers are well-known in the art as illustrated, inter alia, in U.S. Pat. Nos. 3,480,580, 3,481,910, 3,577,365, 3,862,265, 4,506,056, and 3,414,551 the disclosures of which are incorporated herein by reference. Such processes are well-known in the art, for example, an independent source of the description of the process is found in Y. Minoura, M. Ueda, S. Mizinuma and M. Oba, J. Applied Polymer Sci. 1625 (1969). The use of heat and/or physical shearing optionally with the free-radical initiators, in such equipment as extruders, masticators, and the like, to simultaneously accomplish controlled degradation in molecular weight of the polypropylene along with the free-radical grafting of the maleic anhydride, as is known in the art, will be useful in accordance with this invention.

In particular, it is preferable to conduct the maleinization with such amounts of maleic anhydride and free-radical initiators, and under conditions of temperature and shearing such that free-radical sites on the polypropylene are formed substantially at the time of scission of the polypropylene chains and are formed at the point of such scission. The maleic anhydride is then grafted onto the scissioned end of one side of such broken chains. In this manner the anhydride groups are located principally at the ends of the maleated polypropylene chains, and the substantial majority of such maleated polypropylene chains contain one site of maleinization. This procedure permits grafting of the maleated polypropylene at its maleated end to the maleated block copolymer though the use of a difunctional linking or grafting agents having two functional groups each functional group being reactive with a maleate group on the polypropylene and block copolymer. Multiple sites of maleinization can lead to grafting of the maleated polypropylene to more than one maleated block copolymer polymer chain or at more than one site of one or more maleated block copolymer. The same substantial chemistry applies to the centipede polymers of the present invention.

In accordance with the above, the free-radical initiator is preferably used and will typically be utilized in an amount of from about 0.01 to 1.0 wt. %, preferably from about 0.02 to 0.5 wt. %, and most preferably from about 0.04 to 0.3 wt. % of the total polypropylene, and solvent if used, and will be added first. The mixture is then heated to a temperature at or about the known decomposition temperature of the selected free-radical initiator, concurrently with any optional mechanical shearing. The maleic anhydride is subsequently added in an amount typically from about 0.01 to 10.0 wt. %, preferably from about 0.1 to 5 wt. %, and most preferably about 0.75 to 2 wt. % of the total polypropylene.

The maleated polypropylene of this invention contain from about 0.01 wt. % incorporated maleic anhydride, based upon the weight of the maleated polypropylene, up to about 5 wt. %. Preferably the maleic anhydride content will be from about 0.01 to about 2 wt. %, most preferably about 0.03 to about 0.2 wt. %. As will be apparent, unreacted polypropylene will also be present in the reaction mix as will minor amounts of reaction by-products, such as decomposed free-radical initiator compounds and low molecular weight free-radical products. These by-products are substantially removed, by methods known in the art, e.g., sparging with nitrogen or washing with water. Maleic anhydride may not be left in substantial amounts in the polymer without detrimental affects on the subsequent reaction of the poly (maleimide-co-alkenyl benzene) with the maleated polypropylene.

The poly(alkenyl benzene-co-maleimide) of the present invention is formed by reacting a poly[alkenylbenzene-(co)-(maleic anhydride)] at from about 100° C. to about 250° C. and from about slightly above vacuum to about 20 atmospheres, under substantially dry conditions in the presence of a primary amine. The present invention is preferably directed to a polymer compositions of a poly(styrene-co-maleimide) formed by reacting a poly(styrene-co-maleic anhydride) with a primary amine.

For the purposes of this invention, poly(alkenyl benzene-co-maleimide) and poly(alkyl benzene-co-maleic anhydride) are defined to encompass random and stereospecific copolymers, including copolymers having alternating alkenyl benzene and maleimide or maleic anhydride contributed monomer units along the polymer backbone. Such alternating structure are typically described as poly (alkenyl benzene-alt-maleimide) and poly(alkyl benzene-alt-maleic anhydride); however, these polymers are encompassed herein within the descriptions poly(alkenyl benzene-co-maleimide) and poly(alkyl benzene-co-maleic anhydride).

Processes for forming poly(alkyl benzene-co-maleic anhydride) polymers are well known to those skilled in the art. The preparation of the copolymers from electron donor monomers, such as styrene, and electron acceptor monomers, such as maleic anhydride, as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N. G. Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry), A4, 127 (1970).

Poly(alkyl benzene-co-maleic anhydride) polymers are prepared by reacting monomers of alkenylbenzene with maleic anhydride. The preferred alkenyl benzene monomers used for forming the poly(alkyl benzene-co-maleic anhydride) polymer are styrene or α-methylstyrene. Suitable, but less preferred substitutes are: p-methylstyrene, 4-phenylstyrene, m-methylstyrene, o-methylstyrene, p-tert-butylstyrene, dimethylstyrene, and combinations thereof.

The poly(alkyl benzene-co-maleic anhydride) for use in the present invention is a polymer containing from about 5 to 99 mole percent of maleic anhydride monomer with the remainder being alkyl benzene monomer. The preferred poly(alkyl benzene-co-maleic anhydride) contains from 20 to 50 mole percent of maleic anhydride monomer. The most preferred poly(alkyl benzene-co-maleic anhydride) for use in the present invention is poly(styrene-co-maleic anhydride) containing 50 mole percent of maleic anhydride monomer and 50 mole percent of styrene monomer. The comonomers, maleic anhydride and alkenyl benzene, can be randomly or alternatingly distributed in the chain, however, it is preferred to have these comonomers alternating along the polymer backbone chain.

The poly(alkenyl benzene-co-maleic anhydride) has a molecular weight range between about 1,000 and up to about 500,000 or higher, more typically between about 10,000 and 500,000, and even more typically between about 150,000 and 450,000, where the molecular weight is weight-average ("$M_w$").

The poly(alkenyl benzene-co-maleimide) of the present invention is formed by reacting a poly(alkyl benzene-co-maleic anhydride) in the presence of a mono-primary amine at a temperature from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer. It is preferable to purge the mixer with nitrogen prior to the charging of the reactants. The primary amine may be added in a singular charge or in sequential partial charges into the mixer containing a charge of poly(alkyl benzene-co-maleic anhydride). Preferably the primary amine is charged in ratio between 0.8 to 1.0 of moles of amine per monomer contributed units of maleic anhydride in the poly(alkyl benzene-co-maleic anhydride).

Suitable primary amine include but are not limited to: alkyl amines; alkyl benzyl amines; alkyl phenyl amines; alkoxybenzyl amines; alkyl aminobenzoates; alkoxy aniline; and other linear primary amines containing from 1 to 50 carbon atoms, preferably 6 to 30 carbon atoms, in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are: hexylamine, octylamine, dodecylamine and the like.

The poly(alkenyl benzene-co-maleimide), prior to grafting with maleated polypropylene, preferably has a molecular weight range between about 1,000 and up to about 500,000 or higher, more typically between about 10,000 and 500,000, and even more typically between about 150,000 and 450,000, where the molecular weight is weight-average ("$M_w$").

The centipede polymer of the present invention may be prepared by any means well known in the art for combining such ingredients, such as blending, milling or internal batch mixing. A rapid and convenient method of preparation comprises heating a mixture of the components to a temperature of about 50° C. to about 290° C.

The centipede polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed type Brabender mixer, extruding machine, kneader, continuous mixer, etc., is acceptable. The closed-type Brabender mixer is preferable, and mixing in an inactive gas environment, such as nitrogen or carbon dioxide, is also preferable.

Grafting of maleated polypropylene and poly(alkenyl benzene-co-maleimide) is performed by addition of a grafting agent such as a polyamine, preferably an organic diamine, to a blend of maleated polypropylene and poly (alkenyl benzene-co-maleimide) to partially cross-link the polypropylene to the poly(alkenyl benzene-co-maleimide) through the maleate functional groups.

Suitable organic diamines or diamine mixtures containing two aliphatically or cycloaliphatically bound primary amino groups are used as grafting agents for the process according to the present invention. Such diamines include, for example, aliphatic or cycloaliphatic diamines corresponding to the following general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-heterocyclic ring having from 4 to 20 carbon atoms, e.g., ethylene diamine; 1,2- and 1,3- propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane, 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4- diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-amino-benzylamine; m-phenylenediamine; 4,4'-$C_1$–$C_6$-dianiline such as 4,4'-methylenedianiline; aniline-formaldehyde resin; and trimethylene glycol di-p-aminobenzoate. Mixtures of these diamines may also be used.

Other suitable polyamines for use as grafting agents in the process according to the present invention include bis-(aminoalkyl)-amines, preferably those having a total of from 4 to 12 carbon atoms, e.g., bis-(2-aminoethyl)-amine, bis-(3-aminopropyl)-amine, bis-(4-aminobutyl)-amine and bis-(6-aminohexyl)-amine, and isomeric mixtures of dipropylene triamine and dibutylene triamine. Hexamethylene diamine, tetramethylene diamine, and especially 1,12-diaminododecane are preferably used.

Thus in the preferred embodiment the process for preparing the grafted polymer of this invention comprises the steps of:

(A) combining a commercially available poly[alkenylbenzene-(co)-(maleic anhydride)] and a primary amine under substantially dry conditions sufficient to react substantially most of the acid anhydride moieties to form the poly(alkenyl benzene-co-maleimide); and, (B) mixing a commercially available maleated polypropylene with the mass of step (A) under substantially dry conditions of elevated temperature;

(C) adding a diamine to the reaction mass of step (B), under a condition of agitation sufficient to form the grafted polymer of the present invention and cooling; and, (D) adding an extender oil to the final polymer of step (C) under conditions of agitation.

In broadest terms the process for preparing the grafted polymer of this invention comprises combining the poly(alkenyl benzene-co-maleimide) with the maleated polypropylene and the grafting agent under conditions sufficient to permit grafting of at least a minor portion of the poly(alkenyl benzene-co-maleimide) onto the polypropylene. Thus the grafted centipede polymer composition of this invention will comprise the reaction product of the above described the poly(alkenyl benzene-co-maleimide) grafting agent and the maleated polypropylene. The grafting reaction is accomplished by contacting the grafting agent and the poly(alkenyl benzene-co-maleimide) with the maleated polypropylene whereupon interaction and cross linking take place. Apparently the primary amino groups of the grafting agent react to form covalent chemical bonds (imide bonds) with the maleic moieties of the maleated polypropylene and the poly(alkenyl benzene-co-maleimide). The polypropylene is thus grafted to the poly(alkenyl benzene-co-maleimide) through covalent chemical functional linkages.

For best results, a proportion of approximately one-half molar equivalent of grafting agent per molar equivalent of maleic moiety can be employed due to the difunctionality of the grafting agent. The contacting can be accomplished by combining solutions of the polymeric reactants in suitable solvents, such as benzene, toluene, and other inert organic and inorganic solvents, in a suitable reaction vessel under substantially anhydrous conditions. Heating will accelerate the reaction and is generally preferred. More preferably commercially, the contacting can be accomplished by pre-mixing pre-formed pellets of the neat functionalized polymers and adding the grafting agent and melt processing in a physical blender or mixer, such as a Brabender mixer or an extruder, at temperatures of from about ambient to about 350° C., preferably about 75° to about 300° C., and most preferably 120° C. to about 250° C. It is important that essentially all moisture or water be removed by drying prior to contacting the polymer reactants in order to avoid hydrolysis reactions which will compete with the sought cross linking and reduce the yield of the grafted copolymer composition of this invention.

The amounts of poly(alkenyl benzene-co-maleimide) and maleated polypropylene reacted into the grafted compositions of the invention may vary somewhat depending upon the properties desired in the finished composition. In general, the amounts of maleated polypropylene included in the grafted composition may range from about 1 to about 50 percent by weight based on total weight of composition. Preferred amounts of maleated polypropylene are from 1 to 30 percent by weight with a particularly preferred amount being from 10 to 25 percent by weight. The amounts of poly(alkenyl benzene-co-maleimide) centipede polymer included in the grafted composition may range from about 99 to about 50 percent by weight based on total weight of composition. Preferred amounts of the centipede polymer are from 99 to 70 percent by weight with a particularly preferred amount being from 90 to 75 percent by weight.

The centipede polymer gels of the present invention have an extender added to the prepared grafted copolymers during final processing. Suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in the compositions of the present invention are low molecular weight organic materials having a number-average molecular weight of less than 20,000, preferable less than 10,000, and most preferably less than 5,000. Although there is no particular limitation to the material which may be employed, the following is a list of examples of appropriate materials:

(1) Softening agents, namely aromatic naphthenic and paraffinic softening agents for rubbers or resins;

(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

(3) Tackifiers, namely coumarone resins, coumarone-indene resins, terpene phenol resins, petroleum hydrocarbons and rosin derivative;

(4) Oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;

(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and, (6) Petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used as extenders.

In accordance with the present invention, the grafted polymer containing gel composition of the present invention may have added thereto at least about 1, preferably 30 to 1,000, parts by weight of extender per 100 parts by weight of the grafted copolymers. Most preferred amounts of added extender include from about 50 to about 500 parts of oil per 100 parts of grafted copolymer and ideally about 80 to about 300 parts of extender per 100 parts of grafted copolymer. The weight percent ratio of the polyalkylene grafted poly (alkenyl benzene-co-maleimide) to the extender is from about 100:1 to about 1:100, preferably 5:1 to about 1:5.

The polymer gels produced according to the present invention generally have high damping properties having a tan δ in the range of about 0.1 to about 1.0, preferably higher than 0.3 over the temperature range of 30° C. to 100° C., and a Shore A hardness ranging from 0 to about 50, preferably about 0 to about 30, most preferably about 5 to 20 at about 20° C. to 25° C. or at room temperature. The service temperature of the gels of the present invention is less than or equal to 100° C. for most of the polymers of the present invention, e.g., 100° C. compression set of the gel is about 50. Some of the extended polymers of the present invention have a potential use up to 140° C.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of grafted copolymer.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4) polyisoprene-polystyrene block copolymers such as Hybler (produced by Kurare Inc.), polynorbornenes such as Norsorex (produced by Nippon Zeon Inc.) and the like. In this case the foregoing materials are equally applicable to the present centipede polymer compositions.

The gels containing oil or low molecular weight component extended and polypropylene compositions of the present invention may be prepared by any means well known in the art for combining such ingredients, such as solution blending, milling, internal batch mixing, or continuous extrusion of a solid form of the centipede polymer and polypropylene compositions and the other ingredients. A rapid and convenient method of preparation comprises heating a mixture of the components to a temperature of about 50° C. to about 290° C.

The gels containing oil extended grafted poly(alkenyl benzene-co-maleimide)-polypropylene compositions of the present invention can be manufactured by mixing and dynamically heat-treating the components described above, namely, by melt-mixing. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as nitrogen or argon, is also preferable.

The composition obtained using the manufacturing method of this invention can be molded with equipment conventionally used for molding thermoplastics. It is suitable for extrusion molding, calendar molding, and particularly injection molding.

The composition of the present invention can be mixed in any conventional mixer such as a Banbury mixer or roll mill or extruder normally conducted within the temperature range of about 120° C. to about 300° C., preferably maintaining the composition above its melting point for a few minutes up to several hours, preferably 10 to 40 minutes. A particularly useful technique is to add any fillers in the beginning of the mixing cycle in order to take maximum advantage of heating time and to prevent surface bleeding and overheating when forming the molded articles.

The resultant gel composition may be molded in appropriate press ovens and the like to form products in the form of extruded pellets, cut dices, preferably as small as possible since smaller pellets provide short heating times and better flow when utilized in flow molding. Ground pellets may also be utilized.

The extended grafted centipede polymers of the present invention can be used in high temperature applications including uses in injection molding or in any other compositions typically used for elastomeric properties.

In summary, the molded polymers produced from the gels containing extended grafted poly(alkenyl benzene-co-maleimide) and polypropylene compositions of the present invention retain elastomeric characteristics and are useful in high temperature applications and/or high damping applications.

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measurement of damping is the determination of a parameter called tan δ. A forced oscillation is applied to a material at frequency f and the transmitted force and phase shift are measured. The phase shift angle delta is recorded. The value of tan δ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan δ vs. frequency by curve alignment. An alternate method is to measure tan δ at constant frequency (such as at 10 hz) over a temperature range. We have defined a thermoplastic unfilled material as useful for damping when tan δ>~0.3 over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The compositions of the present invention are favorably used in the manufacturing of any product in which the following properties are advantageous: a high degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, and medical instruments.

Representative examples of the use of the extended graft polymers of the present invention are in the fabrication of damping materials and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics, and it is preferable for molding materials. Further, because the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials are as follows:

in audio equipment, such as in insulators for a portable CD or a CD mounted on a vehicle, mike holders for home video cassette recorder, radio cassette recorder, karaoke or handy mike, etc., an edge cone of a speaker, a tape holder of a radio cassette, a holder of a portable mini-disk player, an optical disk holder of a digital video disk, etc.;

in information relating equipment, such as in insulators for a hard disk, insulators for motors such as a spindle motor for HHD and stepping motor, insulators for floppy disk drive, insulators for CD-ROM of personal computer, and a holder for optical disk;

in communication equipment, such as in a holder for compact high performance mike or speaker of a portable telephone, a pocket bell or PHS, a mike holder for a wireless equipment, and a disk holder for portable note type electronic equipment;

in home electronics equipment, such as in insulators for CD-ROM of home TV game, insulators for cassette holder or CD-ROM of cassette holder or game machine, a holder of high performance mike, and cone edge of speaker; and in other applications, such as in damping materials for printer head of a wordprocessor, printer of personal computer, small or middle handy type printer, or name printers, and insulators for CD-ROM used for measure equipment.

In the following, the present invention will be described in more detail with reference to non-limitative examples. The following examples and tables are presented for purposes of illustration only and are not to be construed in a limiting sense.

EXAMPLE 1

Preparation of the Centipede Polymer

A nitrogen purged Brabender mixer (~310 gram capacity) equipped with a Banbury blade was initially set to 30 rpm and the temperature was set to 80° C. The mixer was then charged with 150 g of poly(styrene-alt-maleic anhydride) (obtained from Aldrich Chemical Company of 1001 West Saint Paul Avenue, Milwaukee, Wis. Catalog Number: 18,293-1, CAS Number: 9011-13-6)($M_n$=350,000) and 96 g of octylamine (obtained from Aldrich, 99% purity). After 15 minutes of continuous mixing, the mixture was allowed to heat up at a rate of ~4° C./min. Once the temperature reached 150° C., agitation was discontinued. When the temperature reached 210° C., the heating element was set at isothermal conditions and agitation was again resumed at a speed of 70 rpm and mixing was continued for an additional 60 minutes. The heating element of the mixer was turned off, and the polymer mass within the mixer was permitted to cool down to 160° C. at a rate of ~4° C./min. The agitation was then stopped and the centipede polymer product mass was then removed from the mixer.

IR absorption peaks characteristic of the polymer mass were noted at 705 cm$^{-1}$, 1701 cm$^{-1}$, 1770 cm$^{-1}$, 2855 cm$^{-1}$ and 2926 cm$^{-1}$. The ratio of the intensities was observed at $I_{2926}$ to $I_{1701} \cong 0.55$. $T_g$ was estimated to be at 50° C. The acid value of the polymer was 0.180 meq./gram using the NaOH titration method in a tetrahydrofuran solution.

EXAMPLE 2

Grafting of the Centipede Polymer and Maleated Polypropylene

A nitrogen purged Brabender mixer (~310 g capacity) equipped with a Banbury blade was initially set to 60 rpm and 195° C. The mixer was then charged with 36.6 g of commercial maleated polypropylene (from the Exxon Chemical Company, trade name Exxelor PO 1015). After 6 minutes, a charge of 145 g of the centipede polymer product of Example 1 was added to the mixer. The polymers were agitated for an additional 10 minutes. A charge of 1.6 g of dodecane diamine (from Aldrich, purity=98%) was then added, and at the same time the agitation speed was readjusted to 120 rpm. After 6 minutes the torque of the mixer increased and the agitation speed was again readjusted to 60 rpm. After an addition mixing at 60 rpm for 8 minutes, the heating element of the mixer was turned off and the agitation speed was again readjusted to 40 rpm. The mixture was permitted to cool to about 160° C. at a rate of ~4° C./min. Finally, agitation was discontinued and the grafted polymer product was removed from the mixer.

EXAMPLE 3

A charge of 15 g of the grafted polymer product of Example 2 was added to a Brabender mixer (50 g capacity) equipped with a roller blade. The mixer was initially set to 50° C. and 20 rpm. A charge of 17.7 g of di(tridecyl) phthalate (DTDP) oil was slowly added to the contents of the mixer. After 5 minutes, the temperature of the mixer was reset to 160° C. and the agitation speed was reset to 70 rpm. After 105 minutes of continuous mixing, another charge of 17.8 g of DTDP oil was added to the contents of the mixer. The material was then further mixed for 35 minutes at 90 rpm. The agitation was then discontinued and the product was removed from the mixer.

EXAMPLE 4

A charge of 15 g of the grafted polymer product of Example 2 was added to a Brabender mixer (50 g capacity) equipped with a roller blade. The mixer was initially set to 80° C. and 20 rpm. A charge of 17.7 g of DTDP oil was slowly added to the contents of the mixer. After 8 minutes, the temperature of the mixer was reset to 160° C. amd the agitation speed was reset to 90 rpm. After 12 minutes an additional two grams of the grafted polymer product of Example 2 was added to the contents of the mixer. After 108 minutes of continuous mixing, a charge of 17.8 g of trioctyl phosphate (TOP) oil was added to the contents of the mixer. The material was then further mixed for 195 minutes at 90 rpm. The agitation was then discontinued and the product was removed from the mixer.

The products were thereafter molded into sheets and cylinder buttons at ~155° C. Ring samples were cut from these sheet for tensile measurements. The details of their physical properties are listed in the following Table 1:

TABLE 1

| Example No. | Polymer used | Oil Type (weight %) | PP/Centipede-C$_8$ (wt. ratio) | C.S.[1] (100° C.) | Tb/Eb (psi/%) | Tan δ (−10, 20, 45° C.) | Shore A hardness (25° C.) |
|---|---|---|---|---|---|---|---|
| 3 | Example 2 | DTDP (70%) | 20/80 | 87.8 | — | 0.78, 0.60, 0.58 | 0–2 |
| 4 | Example 2 | DTDP-TOP (67%) | 20/80 | 65.4 | 21/193 | 0.54, 0.51, 0.45 | 0–2 |

[1]The Compression Set (C.S.) was measured based on conditions of ASTM D395-89, except that the sample size and displacement were changed as follows: Sample height - 0.5 inches; Sample diameter - 0.55 inches; Displacement - Sample is compressed to 0.375 inches and stored in an oven at 100° C. (or at 150° C. in subsequent examples) for 22 hours. The sample is removed from the oven, the stress on the sample is relieved, the sample is stored at room temperature for 30 minutes and the recovery of the sample is measured as the final sample height as X in:
Compression Set = ((0.5 − X)/(0.5 − 0.375)) × 100%.

We claim:
1. A method for the formation of a centipede polymer, comprising:
reacting from about 50 wt % to about 99 wt % of a poly(alkenyl benzene-co-maleimide) and from about 0.1 to about 10 wt % of a diamine and subsequently about 1 wt % to about 50 wt % of a maleated polyalkylene under substantially dry conditions sufficient to form a polyalkylene grafted poly(alkenyl benzene-co-maleimide) centipede polymer.
2. The method of claim 1, further comprising the step of: mixing said polyalkylene grafted poly(alkenyl benzene-co-maleimide) centipede polymer with an extender oil in an amount sufficient to from a gel.
3. The method of claim 1, further comprising the step of: mixing about 10 wt % to about 90 wt % of said polyalkylene grafted poly(alkenyl benzene-co-maleimide) centipede polymer with about 90 wt % to about 10 wt % of an extender oil.
4. The method of claim 1, wherein the alkenylbenzene contributed monomer units of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.
5. The method of claim 1, wherein the alkylene contributed monomer units of said maleated polyalkylene is selected from the group consisting of ethylene, propylene and mixtures thereof.

6. The method of claim 1 wherein the maleimide contributed monomer units of the poly(alkenyl benzene-co-maleimide) is formed by the reaction of maleic anhydride and a primary amine.

7. The method of claim 6 wherein the primary amine is selected from the group consisting of: alkyl amines; alkyl benzyl amines; alkyl phenyl amines; alkoxybenzyl amines; alkyl aminobenzoates; and alkoxy aniline; containing from 1 to 50 carbon atoms in the alkyl and alkoxy substituents in the primary amine.

8. The method of claim 1 wherein said diamine is selected from the group consisting of: aliphatic or cycloaliphatic diamines corresponding to the following general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-heterocyclic ring having from 4 to 20 carbon atoms.

9. The method of claim 1 wherein said diamine is selected from the group consisting of: ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline 4,4'-methylenedianiline; aniline-formaldehyde resin; trimethylene glycol di-p-aminobenzoate; bis-(2-aminoethyl)-amine, bis-(3-aminopropyl)-amine, bis-(4-aminobutyl)-amine; bis-(6-aminohexyl)-amine, isomeric mixtures of dipropylene triamine and dibutylene triamine; and mixtures thereof.

10. A centipede polymer gel composition, comprising:
a polyalkylene grafted poly(alkenyl benzene-co-maleimide) comprising from about 50 wt % to about 90 wt % of a poly(alkenyl benzene-co-maleimide) and about 10 wt % to about 50 wt % of a maleated polyalkylene and from about 0.01 to about 10 wt % of a diamine, and
an extender in an amount sufficient to form a gel.

11. The centipede polymer gel composition of claim 10 wherein the weight percent ratio of said polyalkylene grafted poly(alkenyl benzene-co-maleimide) to said extender is from about 100:1 to about 1:100.

12. The centipede polymer gel composition of claim 10, wherein the monomer for forming the alkenyl benzene moiety of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

13. The centipede polymer gel composition of claim 10, wherein the monomer for forming the alkylene moiety of said maleated polyalkylene is selected from the group consisting of ethylene, propylene and combinations thereof.

14. The centipede polymer gel composition of claim 10, wherein said diamine is selected from the group consisting of: ethylene diamine; 1,2- and 1,3- propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline 4,4'-methylenedianiline; aniline-formaldehyde resin; trimethylene glycol di-p-aminobenzoate; bis-(2-aminoethyl)-amine, bis-(3-aminopropyl)-amine, bis-(4-aminobutyl)-amine; bis-(6-aminohexyl)-amine, isomeric mixtures of dipropylene triamine and dibutylene triamine; and mixtures thereof.

15. The centipede polymer gel composition of claim 10, wherein the gel has damping properties having a tan δ in the range of about 1 to about 0.10 over the temperature range of −10° C. to 100° C.

16. The centipede polymer gel composition of claim 10, wherein the gel has a Shore A hardness ranging from about 0 to about 50 at about 20° C. to 25° C.

17. The centipede polymer gel composition of claim 10, wherein the gel has a Shore A hardness ranging from about 0 to 30 at about 20° C. to 25° C.

18. The centipede polymer gel composition of claim 10, further comprising from 1 to 350 parts of a inorganic filler, additive or compounding ingredient based on 100 parts by weight of the grafted copolymer composition component.

19. The centipede polymer gel composition of claim 10, wherein the extender is at least one compound selected from the group consisting of: softening agents, plasticizers, tackifiers, oligomers, lubricants, petroleum hydrocarbons, silicone oil, aromatic oil, naphthenic oil and paraffinic oil.

20. A centipede polymer composition, comprising:
a polyalkylene grafted poly(alkenyl benzene-co-maleimide) comprising from about 50 wt % to about 99 wt % of a poly(alkenyl benzene-co-maleimide) and about 1 wt % to about 50 wt % of a maleated polyalkylene and from about 0.1 to about 10 wt % of a diamine.

21. The centipede polymer composition of claim 20, wherein the monomer for forming the alkenyl benzene moiety of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

22. The centipede polymer composition of claim 20, wherein the monomer for forming the alkylene moiety of said maleated polyalkylene is selected from the group consisting of ethylene, propylene and combinations thereof.

23. The centipede polymer composition of claim 22, wherein said diamine is selected from the group consisting of: ethylene diamine; 1,2- and 1,3- propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline 4,4'-methylenedianiline; aniline-formaldehyde resin; trimethylene glycol di-p-aminobenzoate; bis-(2-aminoethyl)-amine, bis-(3-aminopropyl)-amine, bis-(4-aminobutyl)-amine; bis-(6-aminohexyl)-amine, isomeric mixtures of dipropylene triamine and dibutylene triamine; and mixtures thereof.

* * * * *